US011015698B2

(12) United States Patent
Jiang et al.

(10) Patent No.: US 11,015,698 B2
(45) Date of Patent: May 25, 2021

(54) GEARBOX MOUNTING LINK

(71) Applicant: HAMILTON SUNDSTRAND CORPORATION, Charlotte, NC (US)

(72) Inventors: Yiwei Jiang, Rockford, IL (US); Michael R. Blewett, Stillman Valley, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 239 days.

(21) Appl. No.: 16/148,085

(22) Filed: Oct. 1, 2018

(65) Prior Publication Data
US 2020/0103016 A1 Apr. 2, 2020

(51) Int. Cl.
F02C 7/32 (2006.01)
F16H 57/02 (2012.01)
F16H 57/025 (2012.01)

(52) U.S. Cl.
CPC ............ F16H 57/025 (2013.01); F02C 7/32 (2013.01)

(58) Field of Classification Search
CPC .. F02C 7/32; F05D 2260/311; F05D 2260/96; F05D 2260/30; F16H 57/025; F16H 57/028; F05B 2260/3011; F01D 25/28
See application file for complete search history.

(56) References Cited

U.S. PATENT DOCUMENTS

| 5,927,644 A | 7/1999 | Ellis et al. |
| 6,212,974 B1 * | 4/2001 | Van Duyn ............. F02C 7/32 244/54 |
| 7,093,996 B2 | 8/2006 | Wallace et al. |
| 9,777,639 B2 | 10/2017 | Davis et al. |
| 2013/0042630 A1 | 2/2013 | Muldoon |
| 2017/0260907 A1 * | 9/2017 | Jiang ..................... F16H 57/025 |
| 2017/0260908 A1 | 9/2017 | Jiang et al. |
| 2017/0260909 A1 | 9/2017 | Jiang et al. |
| 2017/0260910 A1 * | 9/2017 | Jiang ....................... F02C 7/32 |
| 2017/0306851 A1 | 10/2017 | Jiang et al. |

FOREIGN PATENT DOCUMENTS

| EP | 3219961 | 9/2017 |
| EP | 3219962 | 9/2017 |
| EP | 3219963 | 9/2017 |

OTHER PUBLICATIONS

Extended European Search Report for European Patent Application No. 19200568.4, dated Mar. 9, 2020.

* cited by examiner

Primary Examiner — Luis A Gonzalez
(74) Attorney, Agent, or Firm — Carlson, Gaskey & Olds, P.C.

(57) ABSTRACT

A link for mounting a first component to a second component according to an example of the present disclosure includes a first piece connectable to the first component, a second piece connectable to the second component, the second piece includes a main body portion receivable in an opening in the first piece. A primary fastener is configured to retain the main body portion of the second piece in the opening. A secondary fastener is configured to retain the main body portion of the second piece in the opening, the secondary fastener capable of withstanding higher loads than the primary fastener. A gas turbine engine assembly and a method of constraining a gearbox with respect to an engine are also disclosed.

19 Claims, 5 Drawing Sheets

GEARBOX MOUNTING LINK

BACKGROUND

This application relates generally to a mounting link between an engine structure and an attached structure, such as an auxiliary gearbox.

Gas turbine engines, such as for an aircraft, are designed to withstand a variety of loads. Attachment links between the engine and an attached structure must also be designed to withstand these loads.

Some example loads are vibrational loads from the operation of the engine. These vibrational loads are relatively easy to predict. Another example are sudden, large loads from certain events. For instance, hard landings and "blade-off" events, in which blades of the engine detach due to impacts or the like, can create large loads or shocks on the engine and/or attached structures. These loads can cause damage to or disconnect the engine, gearbox, and other peripheral attachments to the engine and/or gearbox from one another, if not designed to withstand them. These types of loads are difficult to predict and can be orders of magnitude larger than other, loads that an engine experiences, such as the vibrational loads discussed above.

SUMMARY

A link for mounting a first component to a second component according to an example of the present disclosure includes a first piece connectable to the first component, a second piece connectable to the second component, the second piece includes a main body portion receivable in an opening in the first piece. A primary fastener is configured to retain the main body portion of the second piece in the opening. A secondary fastener is configured to retain the main body portion of the second piece in the opening, the secondary fastener capable of withstanding higher loads than the primary fastener.

In a further embodiment according to any of the foregoing embodiments, the main body portion of the second piece is in an interference fit relationship with the opening in the first piece.

In a further embodiment according to any of the foregoing embodiments, the primary fastener is a fuse pin, and the fuse pin is snugly receivable in a fuse pin opening in the main body portion of the second piece and a fuse pin opening in the first piece.

In a further embodiment according to any of the foregoing embodiments, a plug to retains the fuse pin in the fuse pin opening in the first piece.

In a further embodiment according to any of the foregoing embodiments, the primary fastener is configured to break under an experienced load greater than a breakpoint load, and the secondary fastener is configured to withstand the experienced load.

In a further embodiment according to any of the foregoing embodiments, the secondary fastener includes a threaded portion, the main body portion of the second piece includes a corresponding threaded portion configured to mate with the threaded portion of the secondary fastener.

In a further embodiment according to any of the foregoing embodiments, the secondary fastener includes a first stop pin assembly and a second stop pin assembly, and the first and second stop pin assemblies are snugly receivable in first and second stop pin openings in the main body portion of the second piece and loosely receivable in first and second stop pin openings in the first piece.

In a further embodiment according to any of the foregoing embodiments, the first and second stop pin opening in the main body portion of the second piece are in opposed sides of the main body portion of the second piece.

In a further embodiment according to any of the foregoing embodiments, the primary fastener is a fuse pin, and includes a fuse pin opening in the main body portion of the second piece configured to receive the fuse pin, the fuse pin opening is situated between the first and second stop pin openings of the main body portion of the second piece.

In a further embodiment according to any of the foregoing embodiments, a diameter of the first and second stop pin openings in the first piece is larger than a diameter of a pin portion of the first and second stop pin assemblies.

In a further embodiment according to any of the foregoing embodiments, the link is configured to constrain the first piece with respect to the second piece in a single degree of freedom.

In a further embodiment according to any of the foregoing embodiments, the secondary fastener is arranged orthogonal to the primary fastener.

A gas turbine engine assembly according to an example of the present disclosure includes a gearbox, an engine, and at least one mounting link attaching the gearbox to the engine, the at least one mounting link. The mounting link includes an engine attachment piece, the engine attachment piece includes a main body portion and an aperture is configured to connect the engine attachment piece to an engine and a gearbox attachment piece. The gearbox attachment piece includes a main body portion and an aperture is configured to connect the gearbox attachment piece to a gearbox. The main body portion of the gearbox attachment piece is receivable in an opening in the main body portion of the engine attachment piece in an interference fit relationship. A fuse pin is configured to retain the main body portion of the gearbox attachment piece in the opening. At least one stop pin assembly is configured to retain the main body portion of the gearbox attachment piece in the opening. At least one stop pin assembly is capable of withstanding higher loads than the fuse pin, the at least one stop pin assembly is arranged perpendicular to the fuse pin.

In a further embodiment according to any of the foregoing embodiments, at least one stop pin assembly includes a first stop pin assembly and a second stop pin assembly, the first and second stop pin assemblies arranged on opposite sides of the fuse pin.

In a further embodiment according to any of the foregoing embodiments, the fuse pin is configured to break under an experienced load greater than a breakpoint load, and at least one stop pin assembly is configured to withstand the experienced load and the breakpoint load is greater than normal loads of the engine.

In a further embodiment according to any of the foregoing embodiments, the gas turbine engine includes a driveshaft connection point on the gearbox. The driveshaft connection point is configured to receive a drive shaft for transmitting torque between the engine and the gearbox.

In a further embodiment according to any of the foregoing embodiments, the driveshaft connecting point includes a seal, and the seal constrains the gearbox with respect to the engine in two degrees of freedom.

In a further embodiment according to any of the foregoing embodiments, at least one mounting link constrains the gearbox with respect to the engine in one degree of freedom.

A method of constraining a gearbox with respect to an engine according to an example of the present disclosure includes securing an engine attachment piece of a link to an engine, securing a gearbox attachment piece of a link to a gearbox, and securing the engine attachment piece to the gearbox attachment piece. The gearbox attachment piece includes a main body portion receivable in an opening in the first piece in an interference fit relationship. A primary fastener is configured to retain the main body portion of the gearbox attachment piece in the opening. A secondary fastener is arranged orthogonal to the primary fastener and configured to retain the main body portion of the gearbox attachment piece in the opening, the secondary fastener capable of withstanding higher loads than the primary fastener.

In a further embodiment according to any of the foregoing embodiments, the primary fastener is configured to break under an experienced load greater than a breakpoint load, and the secondary fastener is configured to withstand the experienced load, and the breakpoint load is greater than normal loads of the engine.

DETAILED DESCRIPTION

A mounting link connects an engine to a gearbox. The mounting link generally includes an engine attachment piece and a gearbox attachment piece. The first and second portions are connected to one another via two fasteners, a breakable primary fastener and a durable secondary fastener. The breakable primary fastener secures the engine attachment portion rigidly in a single degree of freedom with respect to the gearbox attachment portion, but is configured to break under a breakpoint load. The durable secondary fastener loosely constrains the engine attachment piece in a single degree of freedom with respect to the gearbox attachment piece, and is capable of withstanding the breakpoint load.

Figure 1:
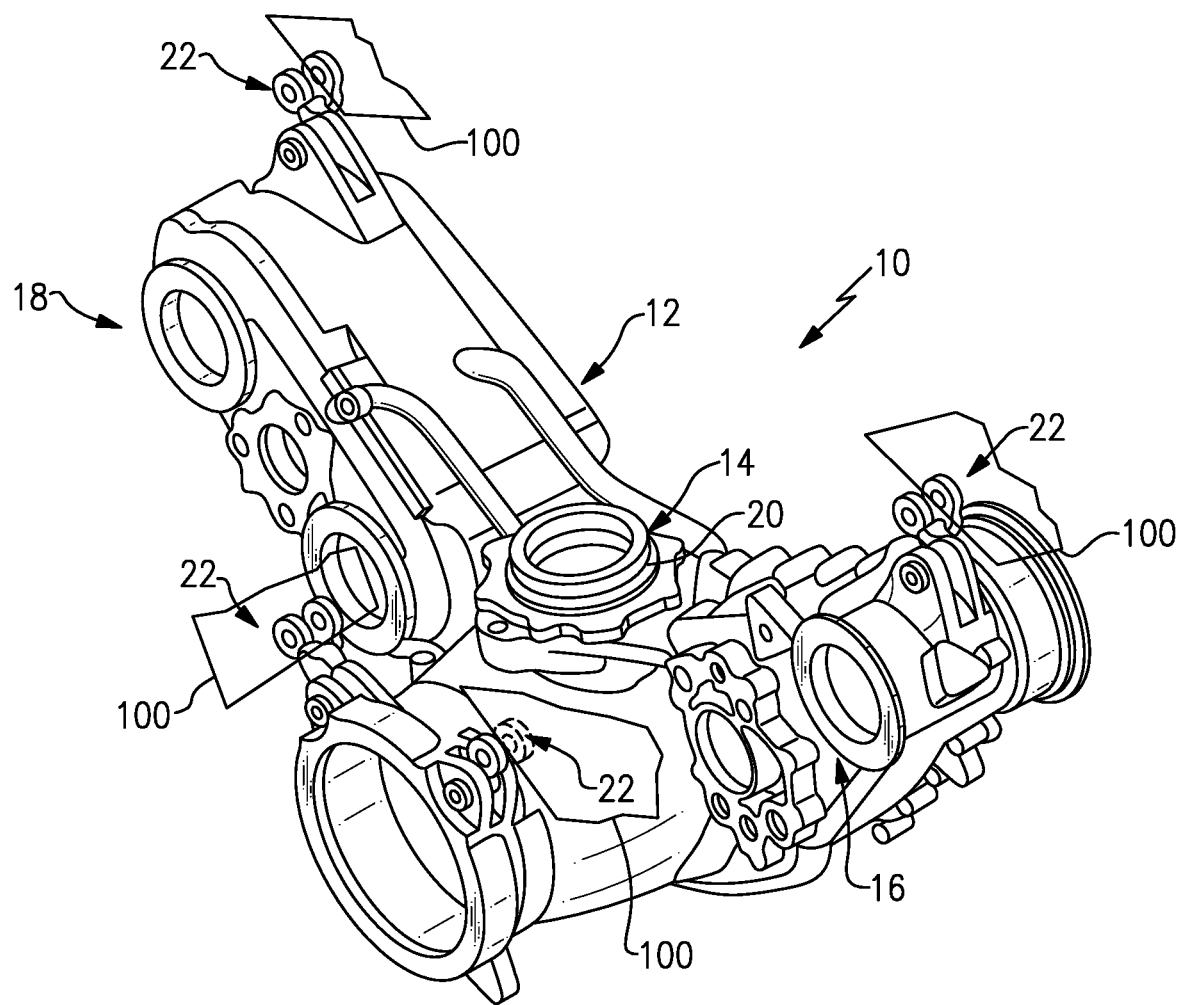
FIG. 1 schematically shows a perspective view of a gearbox assembly for a gas turbine engine.

FIG. 1 schematically shows a perspective view of a gearbox assembly 10 for a gas turbine engine. The gearbox assembly 10 includes a gearbox 12 and one or more mounting links 22. In the example of FIG. 1, the gearbox assembly 10 includes four mounting links 22, however, in other examples, the gearbox assembly 10 includes more or less mounting links 22. The mounting links 22 secure the gearbox 12 to an engine 100. The engine 100 is shown only schematically, and can be, for example, and aircraft gas turbine engine with an engine case, or another engine component to which the gearbox 12 is secured.

The gearbox 12 includes a driveshaft connection point 14, which is configured to receive a driveshaft (not shown) to transmit torque between the engine 100 and the gearbox 12. The gearbox 12 also includes a seal 20 surrounding the driveshaft connection point 14. Finally, the gearbox 12 includes one or more peripheral drive connections 16, 18. The peripheral drive connections are connection points for auxiliary drive shafts driven by the gearbox 12 and engine 100, such as for air circulation systems or electrical generators.

The driveshaft connection point 14, seal 20, and mounting links 22 constrain the gearbox 12 with respect to the engine 100 in all six translational and rotational degrees of freedom. For instance, the seal 20 is a spigot-type annular seal that constrains the gearbox 12 in two of the degrees of freedom in the plane of the seal 20. The mounting links 22 constrain the gearbox 12 in the remaining four degrees of freedom.

Figure 2:
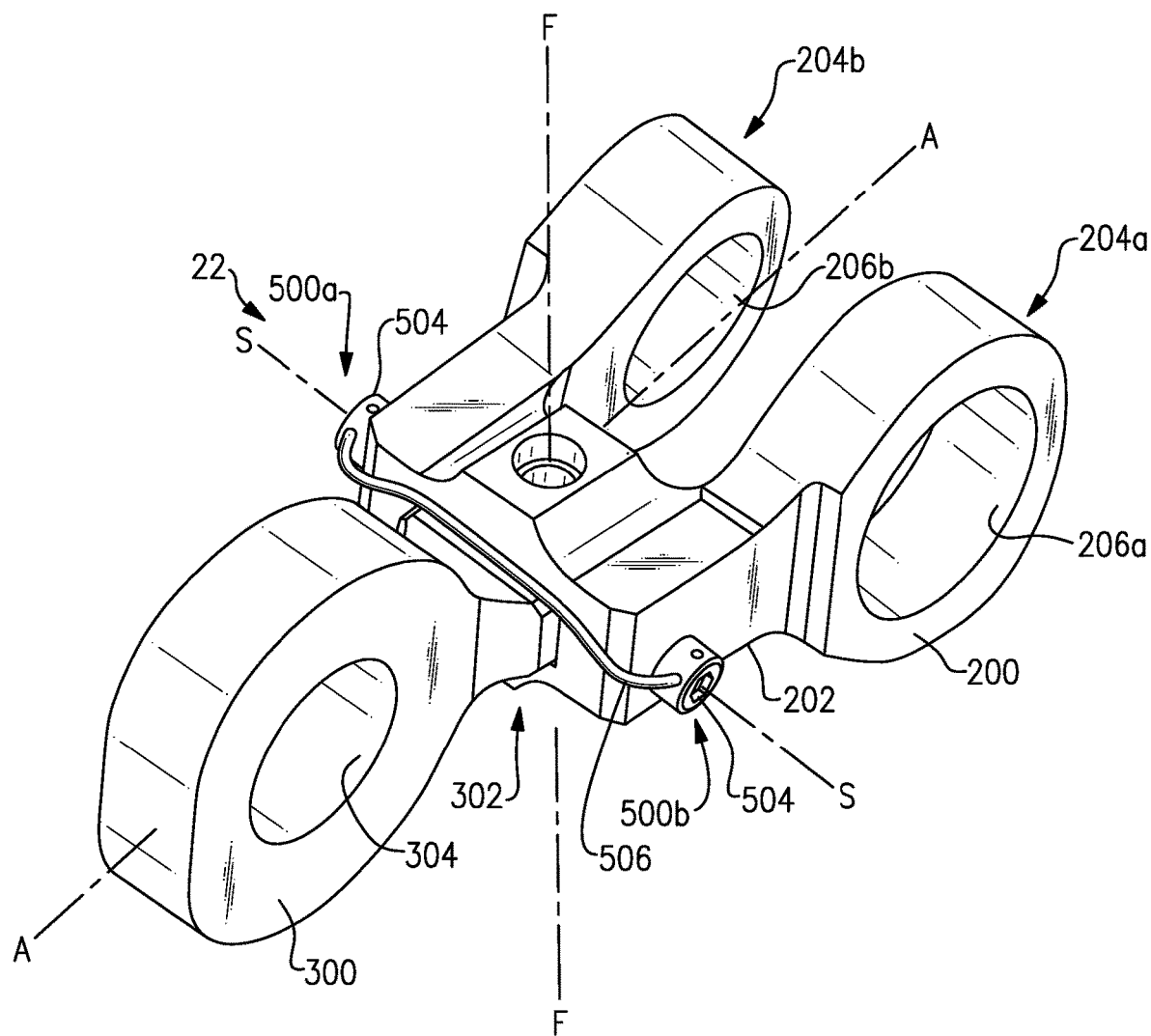
FIG. 2 schematically shows a mounting link of the gearbox assembly of FIG. 1.
Figure 3:
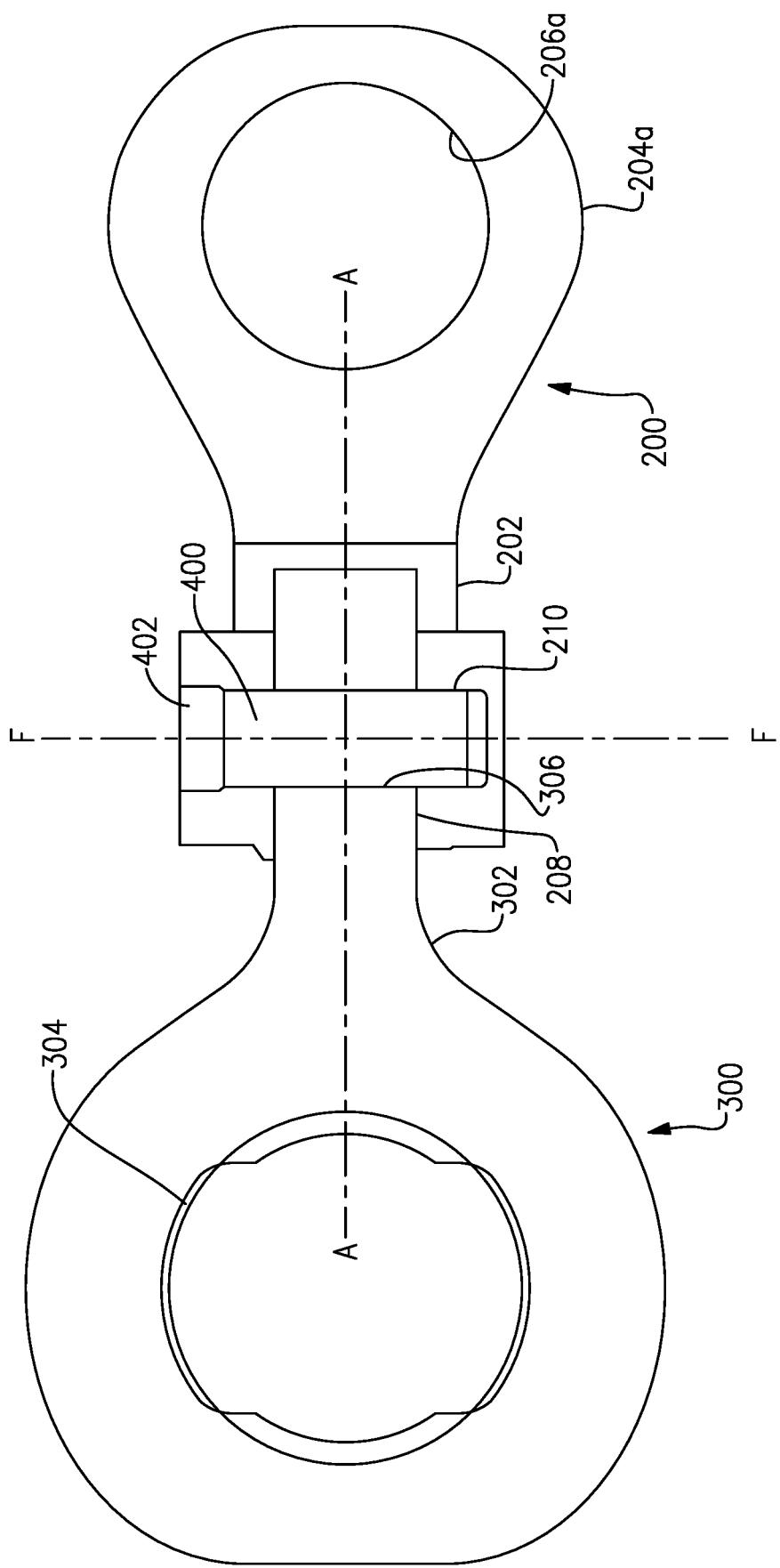
FIG. 3 schematically shows a cutaway view of the mounting link of FIG. 2.
Figure 4:
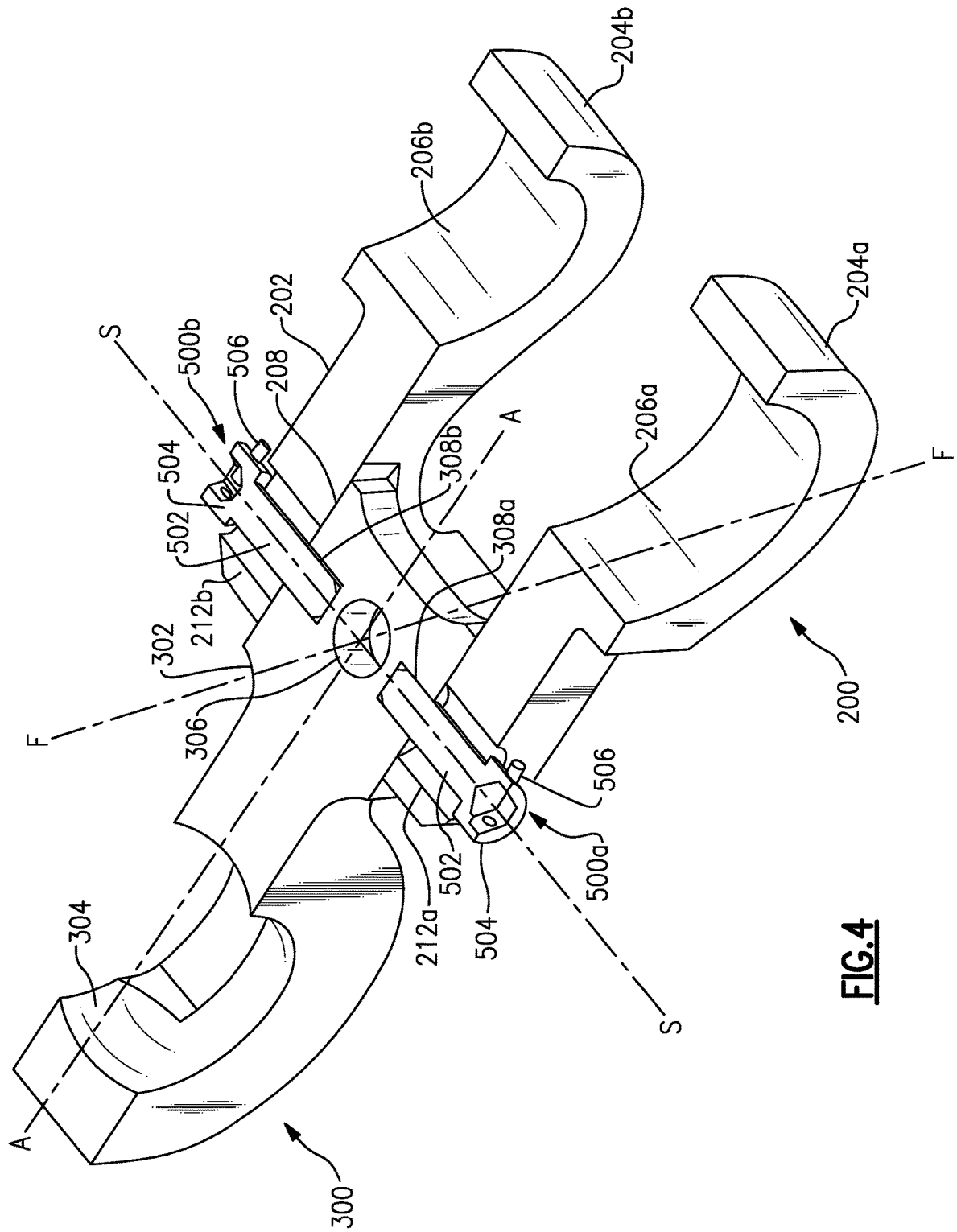
FIG. 4 schematically shows an alternate cutaway view of the mounting link of FIG. 2.
Figure 5:
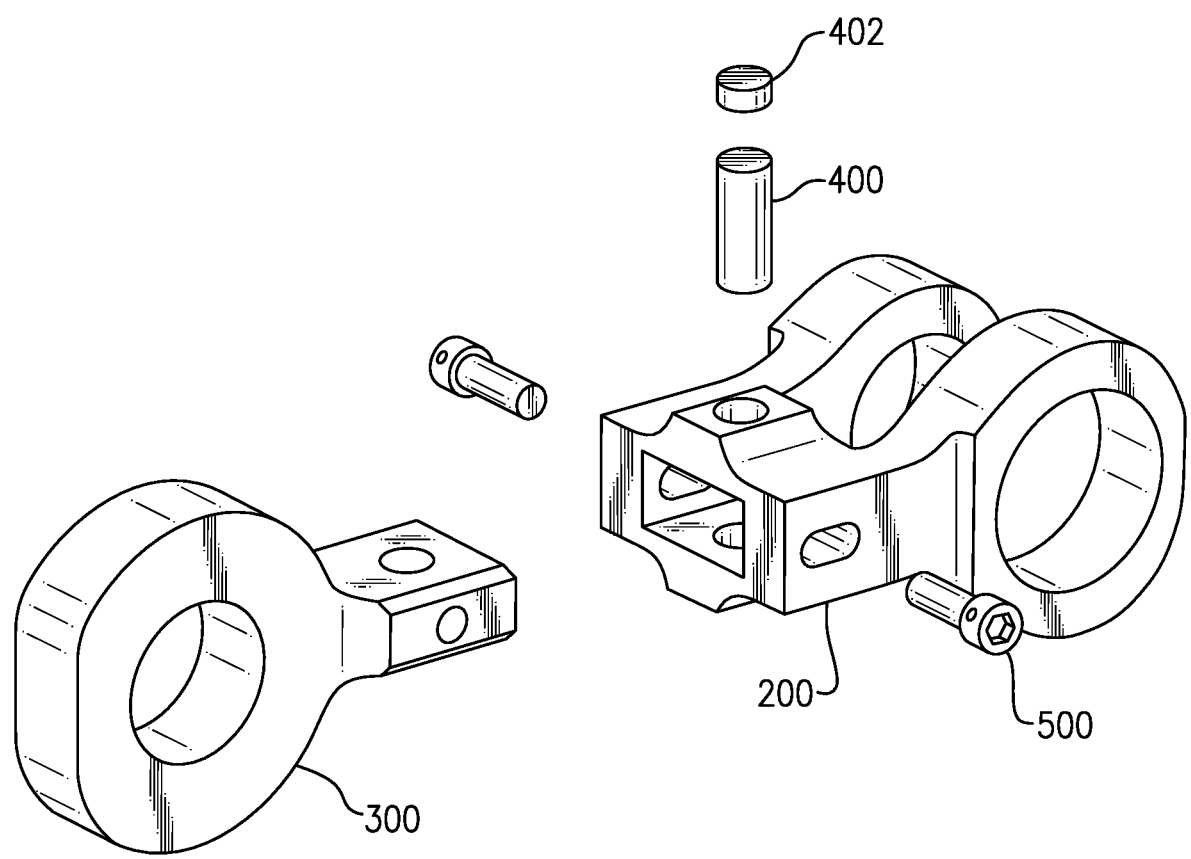
FIG. 5 schematically shows an exploded view of the mounting link of FIG. 2.

Turning now to FIGS. 2-4, the mounting link 22 is shown. The mounting link 22 is a celvis link. A clevis link generally includes three pieces: a first piece into which a second piece is received, and a pin securing the first and second pieces to one another, as will become more apparent with the subsequent description.

As shown in FIGS. 2-4, the mounting link 22 includes an engine attachment piece 200 and a gearbox attachment piece 300. The engine attachment piece includes a main body portion 202 and first and second prongs 204a, 204b extending from the main body portion 202. Each of the first and second prongs 204a, 204b include an aperture 206a, 206b (respectively) which is configured to attach to the engine 100. In one example, a portion of the engine 100 may extend between the prongs 204a, 204b, and a pin (not shown) extends through the engine 100 and apertures 206a, 206b for attachment.

The gearbox attachment piece 300 similarly includes a main body portion 302 and an aperture 304 which is configured to connect to the gearbox 12. In one example, a pin (not shown) extends through aperture 304 and into or through gearbox 12 for attachment.

As best shown in FIGS. 3 and 4, the main body portion 302 of the gearbox attachment piece 300 is receivable in an opening 208 in the main body portion 202 of the engine attachment piece 200 in an interference fit relationship. The opening 208 is generally arranged along an axis A. The main body portion 302 is retained in connection with the main body portion 202 (and thus, the gearbox attachment piece 300 is retained in connected with the engine attachment piece 200) by a breakable primary fastener and a more durable secondary fastener, as will be discussed in more detail below. The breakable primary fastener secures the engine attachment piece 200 rigidly in a single degree of freedom with respect to the gearbox attachment piece 300, but is configured to break under a breakpoint load. The durable secondary fastener loosely constrains the engine attachment piece 200 in a single degree of freedom with respect to the gearbox attachment piece 300, and is capable of withstanding the breakpoint load.

The breakable primary fastener is a fuse pin 400. As best shown in FIGS. 3 and 4, the fuse pin 400 is snugly receivable in an opening 210 in the main body portion 202 of the engine attachment piece 200 and an opening 306 in the main body portion 302 of the gearbox attachment piece 300. In this way, the fuse pin 400 rigidly retains the main body portion 302 in the main body portion 202, which keeps the gearbox attachment piece 300 and the engine attachment piece 200 rigidly connected to one another. The openings 210 and 306 and fuse pin 400 are generally arranged along a common axis F, which is orthogonal to the axis A discussed above. In other words, the fuse pin 400 is arranged generally orthogonal with respect to the main body portion 302.

In some examples, as in exemplary FIG. 3, a plug 402 is receivable in the opening 210 to keep the fuse pin 400 in place.

The durable secondary fastener is a set of stop pin assemblies 500a, 500b. The stop pin assemblies 500a, 500b each include a pin portion 502 and an end cap portion 504, as best seen in FIG. 4. Pins 502 of the stop pin assemblies 500a, 500b extend through both the main body portion 202 of the engine attachment piece 200 and the main body portion 302 of the gearbox attachment piece 300.

In particular, pins 502 are snugly receivable in a pair of openings 308a, 308b in opposed sides of the main body portion 302 on either side of opening 306 (which receives the fuse pin 400, as discussed above). In some examples, pin assemblies 500a, 500b are bolts, and may include threading on pin portions 502 which corresponds to threading in the main body portions 302. Additionally, pins 502 are loosely received in openings 212a, 212b in opposed sides of the main body portion 202. In other words, as can be seen in FIG. 4, the diameter of the openings 212a, 212b is larger than the diameter of the pins 502.

As best shown in FIG. 4, openings 212a, 212b, 308a, and 308b and pins 502 are generally arranged along an axis S, which is orthogonal to the axes A and F. Accordingly, the pins 502 are arranged generally orthogonal with respect to the fuse pin 400.

In some examples, as in exemplary FIG. 2, a locking wire 506 connects the end cap portions 504 of the stop pin assemblies 500a, 500b on an exterior of the mounting link 22 to further retain the stop pins assemblies 500a, 500b in place. For instance, in the example where step pin assemblies 500a, 500b are bolts, the locking wire 506 prevents loosening of threads. In other examples, thread loosening can be provided in other ways, such as by deformed male threads or helical inserts.

During operation of engine 100, the mounting link 22 may experience sudden large loads. When a load is applied to the mounting link 22, it is transmitted between the engine attachment piece 200 and the gearbox attachment piece 300 via the fuse pin 400 (the breakable primary fastener). The fuse pin 400 is designed to break (or "fuse") under a breakaway load. In particular, the fuse pin 400 breaks when relative movement of engine attachment piece 200 and gearbox attachment piece 300 exerts a load on fuse pin 400 that is larger than the breakway load. In general, the breakaway load is much higher (e.g., orders of magnitude), than normal operating loads experienced by the mounting link 22, (such as vibrational loads from engine 100) but is lower than sudden large loads experience by the mounting link 22, such as a "blade-out" event.

Once the fuse pin 400 is broken, the stop pin assemblies 500a, 500b (the durable secondary fastener) prevent the engine attachment piece 200 and the gearbox attachment piece 300 from separating but allow some relative movement or mechanical play between the pieces 200, 300 as will be discussed in more detail below. This relative movement attenuates loads experienced by the pieces 200, 300 and the mounting link 22 itself. Additionally, the relative movement allows for Coulomb damping of forces transmitted between the engine attachment piece 200 and gearbox attachment piece 300. Coulomb damping is a type of damping in which energy is absorbed via sliding friction between adjacent pieces. In this example, are main body portion 202 of the engine attachment piece and the main body portion 302 of the gearbox attachment piece, are in an interference fit relationship with one another and thus generate sliding friction when moving relative to one another and provide Coulomb damping. Accordingly, once the fuse pin 400 is broken, the engine attachment piece 200 and the gearbox attachment piece 300 are still connected to one another, but forces transmitted between them are reduced by the Coulomb damping.

The stop pin assemblies 500a, 500b are more durable relative to the fuse pin 400. In other words, the stop pin assemblies 500a, 500b can withstand forces greater than the breakaway force discussed above, including sudden large loads experience by the mounting link 22, such as a or "blade-out" event.

As discussed above, the pins 502 are snugly received in openings 308a, 308b in the main body portion 302 of the gearbox attachment piece 300 but are only loosely received in openings 212a, 212b in the main body portion 202 of the engine attachment piece 200. Therefore, the main body portions 202 and 302 are somewhat able to move relative to one another as the pins 502 can move within the openings 212a, 212b. Since the pins 502 are snugly connected to the main body portion 302 of the gearbox attachment piece 300, the gearbox attachment piece 300 moves with the pins 502 as they move around in the openings 212a, 212b. Snug fits approach an interference fit, e.g., a "light" interference fit, or are an interference fit relationship.

Because only the stop pin assemblies 500a, 500b are required to withstand very high forces, as discussed above, the mounting links 22 can have reduced cost, weight, size, and mechanical complexity as compared to a mounting link which is required to withstand very high loads in its entirety.

It should be understood that the pieces 200 and 300 are described as engine attachment piece 200 and gearbox attachment piece 300. However, in other examples, the pieces 200 and 300 are switched such that the piece 200 is attached to the gearbox 12 while the piece 300 is attached to the engine 100.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A link for mounting a first component to a second component, comprising:
    a first piece connectable to the first component;
    a second piece connectable to the second component, the second piece including a main body portion receivable in an opening in the first piece;
    a primary fastener configured to retain the main body portion of the second piece in the opening; and
    a secondary fastener configured to retain the main body portion of the second piece in the opening, the secondary fastener capable of withstanding higher loads than the primary fastener, wherein the secondary fastener is arranged orthogonal to the primary fastener.

2. The link of claim 1, wherein the main body portion of the second piece is in an interference fit relationship with the opening in the first piece.

3. The link of claim 1, wherein the primary fastener is a fuse pin, and the fuse pin is snugly receivable in a fuse pin opening in the main body portion of the second piece and a fuse pin opening in the first piece.

4. The link of claim 3, further comprising a plug to retain the fuse pin in the fuse pin opening in the first piece.

5. The link of claim 1, wherein the primary fastener is configured to break under an experienced load greater than a breakpoint load, and the secondary fastener is configured to withstand the experienced load.

6. The link of claim 1, wherein the secondary fastener includes a threaded portion, the main body portion of the second piece includes a corresponding threaded portion configured to mate with the threaded portion of the secondary fastener.

7. The link of claim 1, wherein the secondary fastener includes a first stop pin assembly and a second stop pin assembly, and the first and second stop pin assemblies are snugly receivable in first and second stop pin openings in the main body portion of the second piece and loosely receivable in first and second stop pin openings in the first piece.

8. The link of claim 7, wherein the first and second stop pin opening in the main body portion of the second piece are in opposed sides of the main body portion of the second piece.

9. The link of claim 8, wherein the primary fastener is a fuse pin, and further comprising a fuse pin opening in the main body portion of the second piece configured to receive the fuse pin, the fuse pin opening situated between the first and second stop pin openings of the main body portion of the second piece.

10. The link of claim 7, wherein a diameter of the first and second stop pin openings in the first piece is larger than a diameter of a pin portion of the first and second stop pin assemblies.

11. The link of claim 1, wherein the link is configured to constrain the first piece with respect to the second piece in a single degree of freedom.

12. A gas turbine engine assembly, comprising:
   a gearbox;
   an engine; and
   at least one mounting link attaching the gearbox to the engine, the at least one mounting link including:
      an engine attachment piece, the engine attachment piece including a main body portion and an aperture configured to connect the engine attachment piece to an engine;
      a gearbox attachment piece, the gearbox attachment piece including a main body portion and an aperture configured to connect the gearbox attachment piece to the gearbox, the main body portion of the gearbox attachment piece receivable in an opening in the main body portion of the engine attachment piece in an interference fit relationship;
      a fuse pin configured to retain the main body portion of the gearbox attachment piece in the opening; and
      at least one stop pin assembly configured to retain the main body portion of the gearbox attachment piece in the opening, the at least one stop pin assembly capable of withstanding higher loads than the fuse pin, the at least one stop pin assembly arranged perpendicular to the fuse pin.

13. The gas turbine engine assembly of claim 12, wherein the at least one stop pin assembly includes a first stop pin assembly and a second stop pin assembly, the first and second stop pin assemblies arranged on opposite sides of the fuse pin.

14. The gas turbine engine assembly of claim 12, wherein the fuse pin is configured to break under an experienced load greater than a breakpoint load, and the at least one stop pin assembly is configured to withstand the experienced load and wherein the breakpoint load is greater than normal loads of the engine.

15. The gas turbine engine assembly of claim 12, further comprising a driveshaft connection point on the gearbox, the driveshaft connection point configured to receive a drive shaft for transmitting torque between the engine and the gearbox.

16. The gas turbine engine assembly of claim 15, wherein the driveshaft connecting point includes a seal, and the seal constrains the gearbox with respect to the engine in two degrees of freedom.

17. The gas turbine engine assembly of claim 16, wherein the at least one mounting link constrains the gearbox with respect to the engine in one degree of freedom.

18. A method of constraining a gearbox with respect to an engine, comprising:
   securing an engine attachment piece of a link to an engine;
   securing a gearbox attachment piece of a link to a gearbox; and
   securing the engine attachment piece to the gearbox attachment piece, the gearbox attachment piece including a main body portion receivable in an opening in the first piece in an interference fit relationship, a primary fastener configured to retain the main body portion of the gearbox attachment piece in the opening; a secondary fastener arranged orthogonal to the primary fastener and configured to retain the main body portion of the gearbox attachment piece in the opening, the secondary fastener capable of withstanding higher loads than the primary fastener.

19. The method of claim 18, wherein the primary fastener is configured to break under an experienced load greater than a breakpoint load, and the secondary fastener is configured to withstand the experienced load, and wherein the breakpoint load is greater than normal loads of the engine.

* * * * *